United States Patent [19]

Schultz

[11] 4,035,330

[45] July 12, 1977

[54] HYDROPHILIC COPOLYMER OF N,N-DI($C_1$-$C_2$ALKYL)ACRYLAMIDE CROSS-LINKED WITH A GLYCIDYL ESTER

[75] Inventor: Herman S. Schultz, Lexington, Mass.

[73] Assignee: Itek Corporation, Lexington, Mass.

[21] Appl. No.: 643,212

[22] Filed: Dec. 22, 1975

[51] Int. Cl.$^2$ .............. C08F 224/00; C08L 37/00; G02C 7/04
[52] U.S. Cl. .................. 260/29.6 R; 264/1; 351/160; 526/230; 526/273
[58] Field of Search ...... 260/80.72, 86.1 N, 29.6 R; 264/1; 351/160; 526/273

[56] References Cited

U.S. PATENT DOCUMENTS

| | | | |
|---|---|---|---|
| 3,082,178 | 3/1963 | Coover | 260/86.1 N |
| 3,112,296 | 11/1963 | Maeder | 260/86.1 N |
| 3,563,953 | 2/1971 | Lehmann et al. | 260/80.72 |
| 3,787,380 | 1/1974 | Stamberger | 260/80.72 |

*Primary Examiner*—Harry Wong, Jr.
*Attorney, Agent, or Firm*—Homer O. Blair; Robert L. Nathans; David E. Brook

[57] ABSTRACT

A hydrophilic copolymer of an N,N-di($C_1$-$C_2$ alkyl)acrylamide is disclosed. The copolymer is formed by reacting, based on 100 parts, from about 20–80 parts of a $C_1$-$C_2$ alkyl substituted acrylamide, about 10–80 parts of a $C_1$-$C_4$ alkyl acrylate, methacrylate, or combinations of acrylate and methacrylate, and about 2–20 parts of a glycidyl ester of acrylic, methacrylic or crotonic acid. The resulting copolymerization product can be equilibrated with water or other aqueous solutions to form hydrogels useful in forming shaped hydrogel articles. One particular shaped article which can be formed is a hydrophilic contact lens. A process for forming the hydrogels is also disclosed.

13 Claims, No Drawings

HYDROPHILIC COPOLYMER OF N,N-DI($C_1$-$C_2$ALKYL)ACRYLAMIDE CROSS-LINKED WITH A GLYCIDYL ESTER

BACKGROUND OF THE INVENTION

1. Field of the Invention

This invention relates to the formation of a hydrophilic copolymer useful in the formation of hydrogel contact lenses and other products.

2. Description of the Prior Art

Recently there has been a great deal of effort devoted to finding new materials which would be more suitable for contact lenses than the polymethyl methacrylate customarily used.

One avenue of approach has been to search for softer and/or more flexible materials, and some of these newer type materials which are described in the patent literature include: silicone rubbers such as those described in McVannel et al., U.S. Pat. No. 3,350,216; poly(4-methyl penetane-1) which is described in Kamath, pentene-Pat. Nos. 3,551,035 and 3,619,044; and fluoropolymers such as those described in Girard, U.S. Pat. No. 3,542,461.

Another avenue of approach has been to search for materials which would have better compatibility with eye fluids. Thus, some researchers have made attempts to treat the surfaces of naturally hydrophobic materials to render them hydrophilic. Others have formed copolymers including at least one monomer which is hydrophilic or which can be treated to make it hydrophilic.

To date, the most widely accepted of the new, hydrophilic, softer contact lens materials are hydrogels formed from aqueous solutions gelled with sparingly cross-linked acrylic polymers. Wichterle et al., U.S. Pat. No. Re. 27,401, describe in general one class of these hydrogels which can be formed from 20 to 97% of an aqueous liquid gelled with a sparingly cross-linked copolymer formed from a major amount of a hydrophilic monoester of acrylic or methacrylic acid cross-linked with a minor amount of a diester of these acids. The commercial soft contact lenses of the Wichterle type appear to contain a polymer network formed from large amounts of hydroxyethyl methacrylate cross-linked with small percentages of glycol dimethacrylate.

Other hydrogels presently described in the patent literature contain certain acrylic monomers together with vinyl pyrrolidone type polymers. See, for example, Seiderman, U.S. Pat. No. 3,639,524 and Leeds, U.S. Pat. No. 3,621,079.

More recently issued patents to Stamberger disclose the use of glycidyl esters of acrylic, methacrylic or crotonic acids as substitutes for the heretofore traditional cross-linking agents, i.e., glycol diacrylates or dimethacrylates. Thus, U.S. Pat. No. 3,758,448 discloses the use of such cross-linking esters in hydrogels based upon water soluble monoesters of acrylic or methacrylic acids with a polyhydric alcohol, whereas U.S. Pat. No. 3,787,380 discloses the use of such cross-linking esters in hydrogels based upon heterocyclic N-vinyl monomers such as N-vinylpyrrolidones and alkyl acrylates or methacrylates.

Despite large amounts of research previously conducted, it is generally agreed that an ideal contact lens has not heretofore been available. This is because of the many stringent requirements of materials suitable for contact lenses. For example, the hydrated material must have sufficient optical clarity and must have structural integrity such that its shape and size do not change over prolonged periods of time under various environmental conditions which would, of course, result in a change in the visual acuity of the wearer.

In addition to these optical properties, suitable materials should have certain other mechanical and durability properties in both the hydrated and anhydrous states. Hydrated materials should be tough, resilient, resistant to compressive and flexural stresses, and should resist tearing and/or nicking. Durability can be further enhanced if the hydrated materials do not become brittle and/or friable upon drying. The anhydrous material should be machinable, such as on a lathe, and readily polishable. It may also be advantageous if the polymerization can be carried out in a mold with or without solvent thereby providing the capability of forming shaped objects without further machining operations, or by spin casting polymerization.

On the other hand, the hydrated lens material should have a soft texture and feel and the capability to transmit fluid and gases such as oxygen and carbon dioxide. These properties would greatly increase the wearing comfort and allowable wearing time of a contact lens.

It is highly desirable, of course, to have contact lenses which can be left in the eye for extended periods of time. Such extended-wear lenses depend upon an oxygen permeability which allows sufficient oxygen to be transported through the lens to provide normal corneal respiration. Oxygen permeability is known to depend upon lens thickness, and is also known to increase with increasing amounts of lens hydration.

SUMMARY OF THE INVENTION

A preferred embodiment of the invention relates to the formation of hydrophilic copolymers of N,N-di($C_1$-$C_2$ alkyl) acrylamide. These copolymers comprise the reaction product based on 100 parts, of from about 20-80 parts of an N,N-di($C_1$-$C_2$ alkyl)acrylamide, about 10-80 parts of a $C_1$-$C_4$ alkyl acrylate or methacrylate esters or combinations of both esters, and about 2-20 parts of a glycidyl ester of acrylic, methacrylic or crotonic acid. The copolymerization product is hydrophilic and insoluble in water, and can be equilibrated in an aqueous solution to form a hydrogel material containing large amounts of water.

The polymerization reaction can be carried out in bulk or in solution. Low temperature initiators such as diisopropyl peroxydicarbonate are preferred, although many other initiators can be used.

Hydrogel materials formed from the unique combination of comonomers described herein have significant advantages over hydrogels previously known. One advantage is the outstanding optical characteristics obtainable with these hydrogels. They can be produced to be optically clear, and yet to have the necessary structural integrity to maintain constant visual acuity.

Additionally, the mechanical properties, including nick and tear resistance, compressive strength, elastic recovery, etc. of these hydrogels can be outstanding. Tough hydrogels can be produced which are nevertheless soft in texture. Additionally, the copolymerization products, before equilibration, can be cut, machined, and/or polished using standard techniques with ease. Also, the products can be produced without stress cracks or voids often present in polymerization reaction products. Even when the hydrogels formed from equilibrated copolymerization products are subsequently dried, they can have outstanding elasticity, toughness, strength and are not brittle as many of the prior art products.

Further, it has been found that high levels of water hydration is an extremely desirable property for hydrogel contact lenses. The copolymers described herein can be synthesized with high levels of water hydration, and yet they retain outstanding mechanical, durability and optical properties, especially at the unusually high hydration levels that can be attained.

DESCRIPTION OF THE INVENTION

The hydrophilic, cross-linked copolymer products according to this invention contain at least three ingredients. These are N,N-di($C_1$-$C_2$ alkyl)acrylamide, at least one $C_1$-$C_4$ alkyl acrylate or methacrylate, and a glycidyl ester of acrylic, methacrylic or crotonic acid. In describing this invention, the percentages of these comonomers are given in parts by weight based on a total of 100 parts for these three classes of comonomers, unless otherwise specified.

All of the copolymers contain N,N-di($C_1$-$C_2$ alkyl)acrylamide in substantial amounts. These acrylamides are unique monomers in that they do not have readily reactable hydrogens, per se. This is also true of their homopolymers. On the other hand, they do form water soluble homopolymers. N,N-di($C_1$-$C_2$ alkyl) acrylamides and homopolymers prepared therefrom also offer solubility in an unusually broad range of solvents. When copolymerized with the acrylate or methacrylate esters described herein, however, water insoluble copolymers are formed. N,N-dimethyl acrylamide is the preferred acrylamide monomer because of its ready commercial availability. Suitable copolymers contain about 20–80 parts by weight of an N,N-di($C_1$-$C_2$ alkyl)acrylamide, and the preferred copolymers of this invention contain about 40–70 parts of an N,N-di($C_1$-$C_2$ alkyl)acrylamide.

Acrylic or methacrylic acid esters of alcohols containing from 1 to 4 carbon atoms are used as comonomers. These esters are present from about 10 to 80 parts, and preferably about 15 to 60 parts. Combinations of both acrylic esters and methacrylic esters can be used as long as the total of both is in the aforementioned ranges.

The particular acrylate or methacrylate esters used will depend upon the balance of properties wanted in the copolymer or hydrogel product. For example, methyl acrylate or methyl methacrylate usually impart higher tensile and compressive strengths, improved tear and nick resistance, and toughness to hydrogels. On the other hand, ethyl and/or butyl acrylates, for example, usually contribute to the ability to design the viscoelastic character for the hydrogels. A mixture of two or more alkyl acrylate or methacrylates can also be used to achieve a desired balance of properties, including the hydrophobic/hydrophilic balance considered desirable.

The third essential comonomer is one or more glycidyl esters of acrylic, methacrylic or crotonic acid. This glycidyl ester should be present in about 2 to 20 parts, and preferably in about 4 to 12 parts based on 100 parts of the three classes of comonomers. Glycidyl methacrylate is the preferred glycidyl ester because it produces materials capable of being used to form hydrogels having relatively high levels of water hydration combined with outstanding optical, mechanical and durability properties.

It has been demonstrated that glycidyl esters of acrylic, methacrylic or crotonic acid function as crosslinking agents in the copolymer prepared as described herein. While not wishing to be bound by such theory, it is further believed that such cross-linking is at least partially achieved by a chain transfer mechanism involving the glycidyl moiety of these esters plus the normal reaction of their double band.

The polymerization reactions are carried out using known initiators, preferably in an oxygen-free atmosphere. To insure uniformity of results, it is important to use carefully controlled polymerization reaction techniques. Reaction exotherms should be controlled to eliminate stress cracking and to obtain optimum conversion of monomers. Good reagent purity levels should be maintained.

The specific temperatures employed for a particular reaction depend upon the initiator, the extrinsic requirements of the reaction system, etc. Low temperature polymerizations, such as those carried out below about 35° C, are preferred for a major part of the reaction cycle because they result in more complete polymerizations, higher molecular weight backbones, and products with lesser amounts of stress cracking.

Representative radical initiators which are suitable include isopropyl peroxydicarbonate, azobisisobutyronitrile, benzoyl peroxide, sodium persulfate alone or combined with sodium sulfoxylate formaldehyde, etc. Lower temperature radical initiators such as isopropyl peroxydicarbonate are preferred because they tend to produce polymerization products with higher molecular weight backbones and with lower reaction exotherm peaks and, in general, better controlled reactions. This is important in forming hydrogel soft contact lenses with an optimum combination of properties. Control and efficient removal of heats of reaction are also important. Small amounts of these initiators, such as 0.01 to 1%, based on the total monomers, are satisfactory.

Additionally, these copolymerizations can be initiated by ultraviolet or high-energy radiation. For example, copolymerization initiated by UV light is possible. With high-energy particles or electromagnetic rays, it is likely that copolymerization can be initiated at room temperature or at even much lower temperatures. With high-energy radiation, cross-linking will occur, and cross-linked copolymers produced in this manner are certainly within the scope of this invention.

Copolymerization may be carried out by bulk or solution polymerization. When solvents are used, a common water miscible solvent for the comonomers can be chosen which avoids formation of a precipitate when the gel forms thereby avoiding cloudiness in the product, if cloudiness is a problem in the ultimate product. Examples of suitable solvents include water, methanol, ethanol, t-butanol, ethylene glycol and combinations of these or other hydroxylic solvents. Tertiary butanol is a particularly useful solvent, where its use is appropriate, because it does not have a tertiary hydrogen that will chain transfer to limit backbone molecular weight. It appears that a small amount of solvent is often desirable to improve monomer conversion and to flatten the exotherm peak.

The copolymerization product can be removed from its mold and cut into any desired shape. Appropriate polymerization vessels include tubes which produce products in the shape of sticks or casting cells to form sheets. Equilibration with water is accomplished by immersing the bulk polymerization products in water or other aqueous solutions, or by exchanging the solvent used in solution polymerizations with an aqueous solution. Sometimes an appropriate intermediate solvent can be used prior to exchange with water.

Hydrophilic copolymers produced as described herein are particularly suitable for use in hydrogel contact lenses. For this use, copolymers formed from the following monomer composition are preferred:

| | |
|---|---|
| N,N-di($C_1$-$C_2$ alkyl)acrylamide | 40–70% |
| Methyl methacrylate | 15–60% |
| Glycidyl methacrylate | 4–12% |

A specific composition which has been found to have outstanding properties for hydrophilic contact lenses is:

| | Wt. % |
|---|---|
| N,N-dimethyl acrylamide | 64 |
| Methyl methacrylate | 30 |
| Glycidyl methacrylate | 6 |

Contact lenses prepared from hydrogels wherein the copolymer has the above compositions have been found to exhibit the optical, mechanical and durability properties required for contact lenses, especially those with unusually high hydration levels. Additionally, it has been found that very thin contact lenses, such as those from about 0.02 to about 0.1 millimeters can be produced which retain these properties and have good absolute oxygen permeability.

Relative qualitative evaluation of mechanical and viscoelastic character and shore durometer hardnesses have been found to be good indicators for many of the mechanical properties required of soft or hydrophilic contact lenses. These provide a good indication of toughness, resilience, nick resistance and ability to resist and recover from compressive and flexural stress such as that encountered in wearing and handling hydrogel contact lenses.

Contact lenses can be fabricated directly from nonhydrated polymer in stick form by cutting, lathing and polishing.

For hydrated forms of the copolymer, the Shore 00 durometer values fell in the 45–90 range. The anhydrous form was evaluated using the Shore D durometer and the values obtained were 65 or greater, preferably 75 or over and more preferably 80 or over.

The preferred monomer compositions listed above result in polymers possessing the higher or preferred values under these test conditions.

In the above description, the desirable properties for soft contact lenses of the copolymer and hydrogels formed therefrom have been emphasized. It should be pointed out, however, that this is only one of many uses for the copolymerization product, before or after equilibration, of this invention. Other products which can be formed from the hydrogels include pessaries, semipermeable membranes, dental liners, hydrophilic coatings for hydrophobic substrates, biological implants such as carriers for therapeutic agents, connective tissue, and prosthetic devices, etc. These are only illustrative of the many uses for such hydrogels, and such uses have been adequately disclosed in many prior art publications.

The following examples further illustrate the invention. All parts and percentages are by weight, unless otherwise specified.

EXAMPLE 1

This example describes the copolymerization of N,N-dimethyl acrylamide, methyl methacrylate and glycidyl methacrylate in bulk and using diisopropyl peroxydicarbonate (IPP) as the reaction initiator. The resulting polymerization product is subsequently equilibrated with water or isotonic saline solution to form a hydrogel. Hypodermic syringe transfer techniques were used throughout and an effort was made to keep the reagent and reaction systems as free of air as possible, as described in the following.

The N,N-dimethyl acrylamide used was obtained from CPC International, Inc. and it was flash distilled under vacuum to remove inhibitor. After purging with argon, it was stored at deep freezer temperatures. The methyl methacrylate obtained from E. I. DuPont Company was flash distilled similarly to obtain a heart cut. The glycidyl methacrylate was obtained from the Borden Company.

The reactor was 14mm ID pyrex tube, approximately 14 inches long, sealed at one end and it was coated with Teflon spray which acted as a release agent. A neoprene self-sealing septum was used of the slip-on type with a foldover rim that was held in place by wiring. Septums were obtained from the Pierce Chemical Company of Rockford, Ill. The septums were preheated by soaking in benzene for 15 minutes with agitation followed by two similar treatments with acetone for one hour, and then they were pumped overnight. The reactor was deoxygenerated by attaching the tube to a manifold by way of a No. 20 hypodermic needle through the septum. The manifold was arranged so that the tube could be alternately evacuated and vacuum opened with high purity argon many times.

Each monomer used was injected into the air free reactor from an argon purged stock bottle consisting of an 8-ounce carbonated beverage bottle equipped with a perforated crown cap in turn equipped with an extracted self-sealing butadiene-acrylonitrile rubber liner. The bottles were purged slowly for 5 minutes with purified argon and opened immediately. They were then pressurized with nitrogen before use so as to force monomers into a hypodermic syringe purged with inert gas a moment before use. The monomers were transferred by volume using density values for each so that the reagents would be in the correct weight ratio. The N,N-dimethyl acryamide/methyl methacrylate/glycidyl methacrylate weight ratio was 48/42/10. Autogenous pressure in the reactor was immediately reduced in a controlled manner and the contents mixed. 0.2 weight percent diisopropyl peroxydicarbonate (density 1.08g/ml) was then injected, mixed and the reactor tube inserted immediately into a 25° C circulating constant temperature water bath. Gelling was noted after two hours in the 25° C water bath. The reactor was in the 25° C water bath for 20 hours. It was immediately reacted further in a circulating constant temperature air bath for 2 hours at 45° C, 2 hours at 70° C and 2 hours at 100° C.

The reaction product was clear, colorless, hard and tough on qualitative examination. The product stick broken out of the reactor was readily cut with a band saw. Estimated percent reaction based on a methanol extraction procedure was 97%. A slice from the stick was hydrated by equilibrating in water to result in an essentially clear, tough, elastomeric, resilient, nick resistant hydrogel. The percent water content relative to the equilibrated, hydrated form and using redried (at 60° C) weight for the calculation was 54.8%. The percent diameter swell relative to initial hydrated form was 22.9%. The 10 second Shore D durometer value of initial reaction form was 82 and the 10 second Shore 00 durometer of the equilibrated hydrated form was 78–80. The qualitative evaluation of the dry and hydrated product indicates it to be a good candidate for fabrication of hydrogel contact lenses by the lathing technique.

EXAMPLE 2

The general procedure of Example 1 was used. The N,N-dimethyl acrylamide obtained from the Kohjin Company of Japan was doubly distilled. The other monomers were similar to Example 1. The reactor was a 17mm ID tube coated with an alkyl silane. The monomers were specially filtered and equipment manipulated to remove adventitious microparticulate matter before use. The N,N-dimethyl acrylamide/methyl methacrylate/glycidyl methacrylate weight ratio was 64/30/6. The density values used were 0.9653, 0.939 and 1.073 respectively. 0.2 weight percent diisopropyl peroxydicarbonate was used based on a density value of 1.080. The reaction tube was put immediately into a constant temperature circulating water bath at 18° C and the reaction bath placed in 18° C bath for 17⅓ hours with gelling at about 1½ hours. The water bath was then raised to 30° C for 2¼ hours. The reaction tube was then immediately transferred to a constant temperature circulating air oven for 2 hours, 10 minutes at 45° C and 2 hours at 70° C.

The polymer was clear, hard, tough and had a 10 second Shore D durometer value of 87–88. Qualitative examination of the hydrated form equilibrated in water indicated the material was essentially clear, unusually and surprisingly tough for the high hydration level, resilient, and nick resistant. The Shore 00 durometer value of the hydrated form was 50. The percent conversion by a methanol extraction procedure was 97.7%. The percent water content on the same basis as Example 1 was 76.7%. Percent diameter swell also on the same basis as in Example 1 was 64.9%. The product is a candidate for use to fabricate extended wear type hydrogel contact lenses. It is generally believed that oxygen permeability is proportional to hydration level at this level of hydration and that the oxygen permeability level of contact lenses of normal thickness made from products in this example should be significantly higher than the minimum oxygen flux required for normal corneal respiration.

EXAMPLE 3

This example was carried out in the same manner and using reagents similar to Example 2. N,N-dimethyl acrylamide, dimethyl methacrylate and glycidyl methacrylate weight ratio was 64/26/10. The time-temperature reaction cycle and use of constant temperature circulating water and air baths was similar to Example 2 except the initial water bath was at 21° C. The product in dry and hydrated forms was similar to Example 2 including the observation that the polymer cut well. It is also essentially clear, surprisingly tough, resilient and nick resistant. Percent conversion by a methanol extraction procedure was 96.7%, 10 second Shore D durometer of the dry form was 85–86; 10 second Shore 00 durometer was 55 and percent water content of the hydrated form was 74.6%.

Those skilled in the art will know, or be able to ascertain by no more than routine experimentation, many equivalents to the specific embodiments expressly described herein. These are within the scope of this invention and are intended to be covered by the following claims.

What is claimed is:

1. A hydrogel formed from an aqueous solution gelled with a copolymer formed by reacting from about 20 to about 80 weight percent of an N,N-di($C_1$–$C_2$ alkyl) acrylamide with from about 10 to about 80 weight percent of at least one $C_1$–$C_4$ alkyl acrylate and from about 2 to about 20 parts of a glycidyl ester of acrylic, methacrylic or crotonic acid.

2. A hydrogen of claim 1 wherein said copolymer is formed from about 40 to about 70 weight percent of N,N-dimethyl acrylamide and contains from about 15 to about 60 weight percent of a $C_1$–$C_4$ alkyl methacrylate.

3. A hydrogel of claim 2 wherein said methacrylate comprises methyl methacrylate.

4. A hydrogel of claim 3 wherein said glycidyl ester is glycidyl methacrylate.

5. A hydrogel of claim 1 in the form of a shaped article.

6. A hydrogel of claim 1 in the form of a contact lens.

7. A hydrogel of claim 4 in the form of a contact lens.

8. A hydrogel of claim 7 wherein said aqueous solution comprises an isotonic solution.

9. A hydrogel formed from an aqueous solution gelled with a copolymer which is the reaction product of from about 40 to about 70 weight percent of an N,N-dimethyl acrylamide, from about 15 to about 60 weight percent of a $C_1$–$C_4$ alkyl methacrylate and from about 4 to about 12 weight percent of a glycidyl ester of acrylic acid, methacrylic acid or crotonic acid.

10. A copolymer of claim 9 where said glycidyl ester is glycidyl methacrylate.

11. A contact lens comprising an optically clear hydrogel formed from an aqueous solution gelled with a hydrophilic, cross-linked copolymer formed from about 40 to about 70 weight percent of an N,N-di($C_1$–$C_2$ alkyl)acrylamide, from about 15 to about 60 weight percent of at least one $C_1$–$C_4$ alkyl methacrylate or acrylate, and from about 2 to about 20 weight percent of a glycidyl ester of acrylic acid, methacrylic acid or crotonic acid.

12. A contact lens of claim 11 wherein said aqueous solution comprises an isotonic solution.

13. A contact lens formed from a hydrogel comprising an aqueous solution and a copolymer formed from about:

| | |
|---|---|
| N,N-dimethyl acrylamide | 40–70% |
| Methyl methacrylate | 15–60% |
| Glycidyl methacrylate | 4–12% |

* * * * *